United States Patent
Charles et al.

(10) Patent No.: US 6,526,515 B1
(45) Date of Patent: *Feb. 25, 2003

(54) REMOTE PLUGGABLE SYSTEM HAVING BAYS FOR ATTACHMENT OF COMPUTER PERIPHERALS

(75) Inventors: Paul Charles, Scottsdale, AZ (US); David Marsh, Scottsdale, AZ (US); Jason Hoendervoogt, Scottsdale, AZ (US)

(73) Assignee: Mobility Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,311

(22) Filed: Dec. 15, 1999

Related U.S. Application Data

(63) Continuation-in-part of application No. 08/963,895, filed on Nov. 4, 1997, which is a continuation-in-part of application No. 08/800,397, filed on Feb. 14, 1997, now Pat. No. 5,941,963, which is a continuation-in-part of application No. 08/743,515, filed on Nov. 4, 1996, now abandoned.

(51) Int. Cl.⁷ .................................................. G06F 1/26
(52) U.S. Cl. ........................................ 713/300; 713/340
(58) Field of Search ................................ 713/300, 340; 710/62

(56) References Cited

U.S. PATENT DOCUMENTS

| | | | |
|---|---|---|---|
| 3,935,527 A | | 1/1976 | Michelet et al. |
| 5,305,180 A | | 4/1994 | Mitchell et al. |
| 5,457,784 A | | 10/1995 | Wells et al. |
| 5,514,859 A | | 5/1996 | Seigel |
| 5,572,108 A | | 11/1996 | Windes |
| 5,579,487 A | | 11/1996 | Meyerson et al. |
| 5,941,963 A | * | 8/1999 | Charles et al. ............ 710/62 |
| 6,014,750 A | * | 1/2000 | Williams ................... 713/300 |
| 6,044,472 A | * | 3/2000 | Crohas ...................... 713/300 |
| 6,295,569 B1 | * | 9/2001 | Shimura et al. ........... 710/129 |
| 6,357,011 B2 | * | 3/2002 | Gilbert ...................... 713/300 |

FOREIGN PATENT DOCUMENTS

| EP | 0814399 | 12/1997 |
|---|---|---|
| FR | 2750228 | 6/1996 |

OTHER PUBLICATIONS

Copy of USSN Provisional Application 60/031,510, filed Nov. 27, 1996.

* cited by examiner

*Primary Examiner*—Dennis M. Butler
(74) *Attorney, Agent, or Firm*—Jackson Walker LLP

(57) ABSTRACT

A system and method are provided for interconnecting computer peripherals with portable and desktop computers and other digital devices. More specifically, the present invention includes a system and method for simultaneously connecting multiple portable computer peripherals to a single portable computer interface slot, for connecting portable computer peripherals to a desktop computer, and for connecting a portable ZIP™ drive to a portable computer. A system for providing a supplemental power supply for the computer peripheral is also provided.

37 Claims, 7 Drawing Sheets

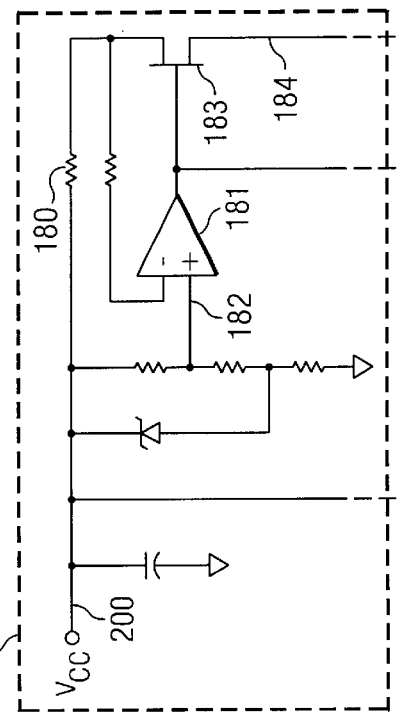
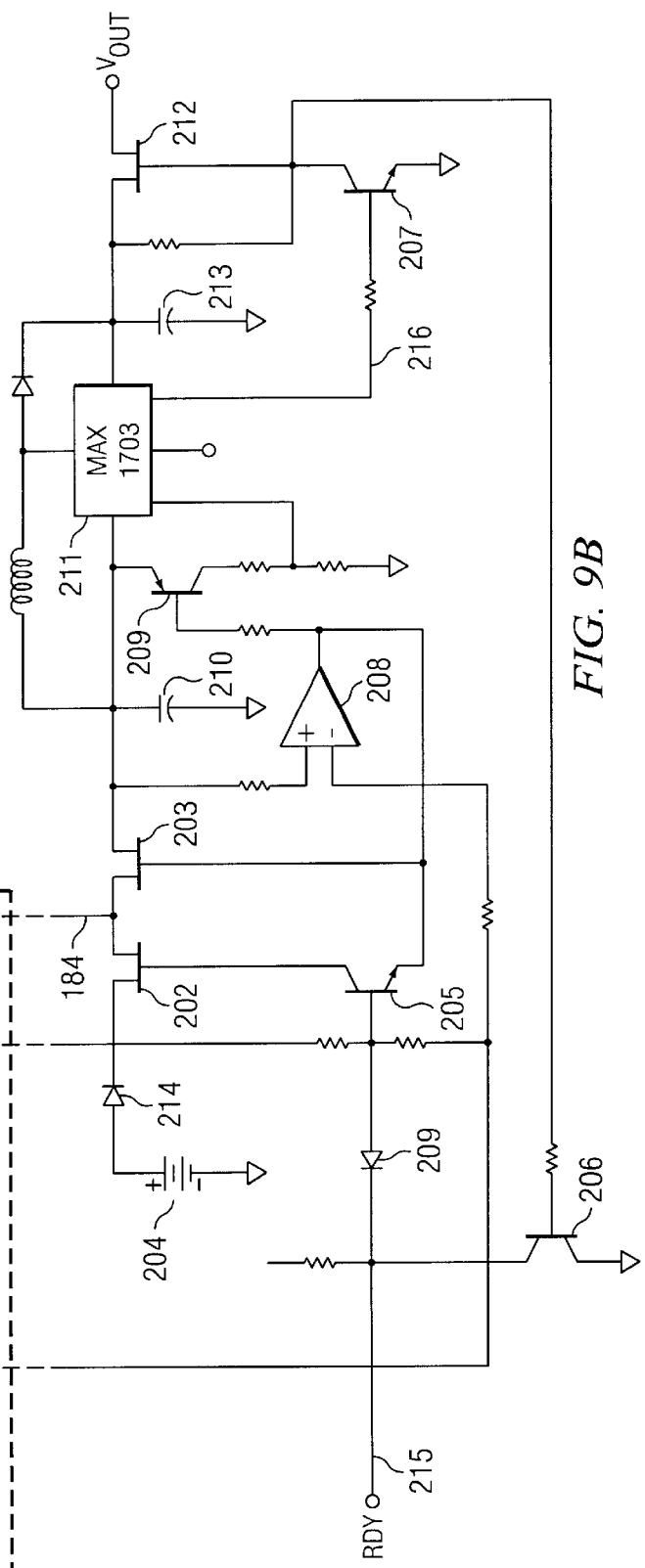
FIG. 9A
FIG. 9B
FIG. 10

REMOTE PLUGGABLE SYSTEM HAVING BAYS FOR ATTACHMENT OF COMPUTER PERIPHERALS

This application is a continuation-in-part of Ser. No. 08/963,895 Nov. 4, 1997 which is a continuation-in-part of Ser. No. 08/800,397 Feb. 14, 1997 U.S. Pat. No. 5,941,963 which is a continuation-in-part of Ser. No. 08/743,515 Nov. 4, 1996 abandoned.

BACKGROUND OF THE INVENTION

1. Field of the Invention

This invention pertains to systems and methods for interconnecting computer peripherals and computing devices. More specifically, the present invention provides a system and method for adapting one or more computer peripherals to a single computer interface slot and for providing an operative connection between the peripheral and the computing device.

2. State of the Art

The present invention generally encompasses interfacing computer peripherals with computers. To understand the benefits derived from the embodiments of the invention to be described herein, it is helpful to understand the existing state of the art and to see why it fails to provide the advantages and benefits of the preferred and alternative embodiments of the present invention. It is also beneficial to a reader to consider the following materials, which are herein incorporated by reference: U.S. patent application Ser. No. 08/399,728 filed on Mar. 7, 1995 and PCT patent application serial no. PCT/US96/03248 filed on Mar. 7, 1996.

The first improvement of the present invention to be described generally pertains to portable computers, but has application with many other types of digital electronic devices. Portable computers are generally understood to include the family of computers known as laptops, notebooks and portables. They are known as portables because they are generally smaller units compared to desktop computers which can more easily be carried from place to place and used at remote locations, often away from plug-in power sources such as AC power outlets. The benefits of mobile computing can be substantial. However, it is often the case that the versatility of these portables is sacrificed for the sake of small size, lower power requirements, and generally any other considerations that make the computer portable. Therefore, peripheral components which are often a part of less easily portable desktop computer systems are not as easily integrated within a portable computer system. These same considerations also apply in the case of many other digital electronic devices.

Because space is limited within a chassis of a portable computer, and power constraints dictate that power drain must be kept to a minimum, most portable computing devices have only one bay which can be used to house only one of various peripheral devices at any given time. This bay is often referred to as a multi-function bay (also referred to herein as a peripheral bay or peripheral slot) when more than one type of peripheral can be inserted therein to communicate with the host portable computer. A floppy drive is often the default peripheral of choice to be placed in the bay because it is used nearly universally for data transfer. However, a CD-ROM drive has also become an almost indispensable peripheral for computers today. Therefore, when a CD-ROM drive is needed, the floppy drive is removed and the CD-ROM drive is inserted in its place, or swapped.

A significant drawback of the single multi-function bay portable computer described above is that only one peripheral device can be used at a time. Furthermore, it was also not mentioned that "hot-swapping", or the replacement of one peripheral device with another when the computer is operational, is typically not possible for floppy drives, CD-ROM drives and similar peripherals. Therefore, the portable computer has to be completely powered down before the swap can be made. When more than one peripheral component is needed or when the swapping of two peripherals must be executed more than once, the cycle of powering down, swapping, and then powering up again can become tedious and wasteful of time.

Therefore, it would be an advantage over the prior art to provide a portable computer which can be simultaneously coupled to more than one computer peripheral which can be swapped in and out, and thus take advantage of the ability to have more than one of the computer peripherals electrically coupled to the portable computer, but without having to swap them. These advantages include the ability to have computer peripherals operatively connected directly with a computing device.

The next improvement of the present invention to be described pertains less specifically to the portable computer, and more to the portable computer peripherals which are swapped in and out of the single multi-function bay. Specifically, consider the situation where a portable computer is purchased with some portable computer peripherals. Typically, these portable computer peripherals are the only peripherals which will operatively connect with the portable computer. Notwithstanding the various reasons for this occurrence such as proprietary connectors, pinouts or timing schemes, the result is that portable computer peripherals will often only operatively connect with the portable computers for which they were specifically designed. Now consider that the same user also has a desktop computer. It is often the case that the same peripherals needed for the portable computer are also needed for the desktop computer. Consequently, the user is forced to buy the same peripherals for the desktop computer that were already purchased for the portable computer. The result is needless expense to the user because of redundancy in functionality of peripherals.

It would be an advantage over the prior art to be able to use the portable computer peripherals with the desktop computer despite the proprietary nature common to the computer peripherals.

Accordingly, it is beneficial to a reader to consider the following prior art. A self-adapting interface assembly linking remote peripheral modules to a host computer I/O port via a serial communication cable has been disclosed by Wells, et al, U.S. Pat. No. 5,457,784, wherein circuitry senses the electrical signals present on the cable and automatically configures the hardware and software to reflect the appropriate serial communication interface specification.

The primary disadvantage of such an approach is that the interfaces are limited to simple serial I/O communication links and is not extendable to the more complex computer parallel bus protocols and their associated "bridging" requirements.

Thus, a significant improvement of the present invention features a predetermined and fixed high speed interface adaptation between two of the group that includes both the high speed serial such as USB and Firewire (IEEE1394) and the massively parallel bus protocols such as those conforming to the interface specifications PCMCIA, SCSI, IDE, FDD, and ATAPI, as examples. Further, since the interface protocol and hardware is always fixed and unique to the specific application, the cost and space for the reprogrammable drivers and receivers and the multiple voltage levels of Wells are avoided.

In accordance with yet another improvement of the present invention, provision is made to provide additional current supplying capacity to a computer peripheral, such as a ZIP™ drive, at times when the current supplied by the portable or desktop computer interface is temporarily not sufficient. For example, the current available under some interface standards may be less than that temporarily required by a computer peripheral, such as during load current changes associated with a starting a disk drive motor and moving of the magnetic heads. The present invention provides this supplementary current to maintain the satisfactory operation of the peripheral.

Further, although the above interface standards were designed to operatively connect and provide power for a plurality of peripheral devices, including CD-ROM, fixed disk drives, and removable disk drives, applications using these interfaces were necessarily restricted to short cable lengths due to the voltage drops associated with the cable impedance under transient high current loading conditions. Thus, at the remote end of longer cables, voltages would drop below the minimum input specification requirements of a peripheral device. While it is well known by one skilled in the art that a low cable voltage can be boosted via a converter assembly, also known as a boost voltage regulator in that it provides both the voltage regulation and the DC voltage level shifting functions, this converter assembly is not typically a part of the input circuitry for peripheral devices.

Accordingly, in the present invention, such voltage boosting and regulation means are provided within the bay along with local charge storage devices to provide the supplemental energy needed to support the transient load change, comprising a first capacitor with battery backup located at the input of the voltage regulation means and a second capacitor at the output of the voltage regulation means.

In a related patent, U.S. Pat. No. 5,572,108, Windes discloses a rechargeable battery pack connected through a current limiting circuit, which uses switchable low and high impedances to protect the power source from excessive loading, to a voltage multiplier, and then to a super capacitor bank for AC or DC high voltage, high power commercial applications that are supplied from an intermittent power source. However, this disclosure does not address the steady low power availability associated with the lower power interface connectors of a portable computer, nor the high instantaneous, but low average power associated with a disk drive mechanism. Further, the recharging circuitry for the rechargeable battery introduces added cost that is avoided with a non-rechargeable and higher energy capacity alkaline battery, as in the present invention.

Michelet, et al, in U.S. Pat. No. 3,935,527, discloses a DC voltage source driving a current limiter followed by a DC voltage converter, but has no provisions for battery buffering as in the present invention.

Finally, Crohas, in U.S. Patent Application No. 60/031,510, discloses an assembly using PCMCIA as a voltage source, traditional current limiting circuit, and a load comprising a reader unit, wherein an input buffering means is a capacitor followed by a voltage converter which boosts the voltage applied to a rechargeable battery which is located on the output terminals of the assembly.

This assembly also provides a shutdown mechanism that is activated upon the output voltage of the battery dropping below a threshold value thus protecting the peripheral device from low voltages. Activation of this shutdown threshold, usually about 5% below a nominal output voltage level, will then disconnect the converter output voltage from the output terminals, thus shutting down the peripheral device, which, in turn, usually causes the computer system to shut down.

However, the placement of a rechargeable battery at the output terminals of the assembly represents a significant disadvantage in that under a heavy transient loading which activates the current limiter circuit, a significant portion of the reserve battery charge is blocked by the activation of the shutdown circuitry, as governed by the equation $$Q = C \times V \tag{1}$$

where Q is the charge, C is the capacitance, and V is the impressed voltage.

Thus, after only a corresponding 5% of the available battery charge being provided to the load, the peripheral device is prematurely shutdown.

In the present invention, however, energy usage is significantly improved with the placement of an alkaline battery at the input of the voltage converter/regulator.

The principal advantage of this configuration over Crohas is that a pulse-width modulated (PWM) converter/regulator is usually operated over a 10–90% duty cycle range to maintain a regulated output voltage, and will thus operate over a significantly wider input voltage range, typically on the order of 25–100% of maximum. Therefore, under the same heavy loading which activates the current limiting circuitry, the same shutdown threshold will still activate at a 5% below nominal output voltage, but that output voltage level will not be reached until the backup battery has discharged approximately 33%, with an attendant 33% drop in battery voltage, and, thus, provided 33% longer operation of the peripheral device compared with the embodiment of Crohas, as governed by the equation $$Q = I \times t \tag{2}$$

where t is time.

OBJECTS AND SUMMARY OF THE INVENTION

In view of the above described state of the art, the present invention seeks to realize the following objects and advantages.

It is an object of the present invention to provide a system and method for adapting and interconnecting computer peripherals and computer systems.

It is another object to provide a system and method for simultaneously connecting multiple computer peripherals to a single computer interface slot so that peripheral swapping is unnecessary.

It is still another object to provide a system and method for connecting any of a number of proprietary computer peripherals to a single computer interface slot.

It is yet another object to provide a system and method for connecting portable computer peripherals to a desktop computer so that these peripherals can be shared by both the portable computer and the desktop computer.

It is also an object to provide a system and method for connecting any of a number of proprietary portable computer peripherals to a desktop computer to reduce peripheral redundancy and thereby reduce the cost of peripheral systems to the user.

It is a further object of the present invention to provide a system and method for efficiently powering computer peripherals which temporarily require more power than is supplied by the interface standard used by the computer.

In accordance with these and other objects of the present invention, the advantages of the invention will become more fully apparent from the description and claims which follow, or may be learned by the practice of the invention to be described hereinafter.

The present invention provides a system and method for accomplishing the objective of adapting and interconnecting computer peripherals with portable and desktop computers and other digital computing devices. In a first aspect of the invention, a single interface slot on a computing device is electrically coupled to an interface port of an external docking bay comprised of a plurality of interface slots or ports. Portable peripherals are electrically coupled to the ports of the external docking bay. The computing device is then able to access all of the peripheral devices in the external docking bay which are normally only accessible one at a time when electrically coupled to a port in a multi-function bay made for receiving a single computer peripheral in the portable computer.

In a related aspect of the present invention, the single interface slot to which the external docking bay is electrically coupled is not necessarily the dedicated multi-function port. In other words, a PC card slot (also known as a PCMCIA slot) can also be used to electrically couple the external docking bay to the portable computer, as can the other interfaces previously mentioned.

Another related aspect of the present invention involves overcoming the proprietary characteristic of some interfaces between computer peripherals, particularly portable computer peripherals, and the computer, particularly portable computers and other computing devices. In other words, the present invention can be used where a variety of different proprietary interface standards are encountered.

Another aspect of the present invention is to provide an external docking bay which can be electrically coupled to a hard drive which is incompatible with the IDE interface or some other standard interface which is normally used by the portable computer or other computing device. This enables the external docking bay to act as an interface to the portable computer for devices which could not otherwise be coupled thereto.

Another aspect of the present invention is related to the advantageous capability of electrically coupling portable computer peripherals to a desktop computer or an expansion chassis. An internal docking bay is provided for insertion within a slot or port of the desktop computer. The internal docking bay is thereby electrically coupled to a communications bus within the desktop computer. The internal bay also provides a port which is compatible with an interface port of a portable computer peripheral. The desktop computer is thus able to interface with the portable computer peripherals as if they were inserted into the portable computer. The portable computer peripherals can still be swapped out of the desktop computer and into the portable computer when they are needed there.

A related approach to using the portable peripheral devices with the desktop computer provides for an external docking bay which accepts and electrically connects the portable peripheral device to the docking bay using the interface of the peripheral device, and such docking bay then electrically connecting to a standard interface module located within a cardslot of the desktop computing device using the interface characteristics of the interface module. The interface module is in turn electrically coupled to a communications bus within the desktop computer, thereby establishing the operative link between the peripheral device and the desktop computer.

Another aspect of the present invention is related to electrically coupling a specific desktop peripheral with a portable computer.

Another aspect of the present invention is to provide a tape drive backup unit which is electrically coupled to the portable computer interface port within the multi-function bay.

Yet another aspect of the present invention is to provide a system and method for efficiently powering computer peripherals, such as ZIP™ drives, which intermittently require more power than is supplied an interface standard, such as the PCMCIA interface standard, used by computers.

These and other objects, features, advantages and alternative aspects of the present invention will become apparent to those skilled in the art from a consideration of the following detailed description taken in combination with the accompanying drawings.

DESCRIPTION OF THE DRAWINGS

FIG. 9A is a detailed schematic diagram showing one preferred arrangement for implementing the current limiting feature represented in FIG. 8.

FIG. 9B is a detailed schematic diagram showing one preferred arrangement for implementing the power management feature represented in FIG. 8.

FIG. 10 is a schematic diagram showing one preferred arrangement for adapting an IDE peripheral device to the PCMCIA standard.

DETAILED DESCRIPTION OF THE PREFERRED EMBODIMENTS OF THE INVENTION

Reference will now be made to the drawings in which the various elements of the preferred embodiments of the present invention will be given numerical designations and in which the preferred embodiments of the invention will be discussed so as to enable one skilled in the art to make and use the invention.

Figure 1:
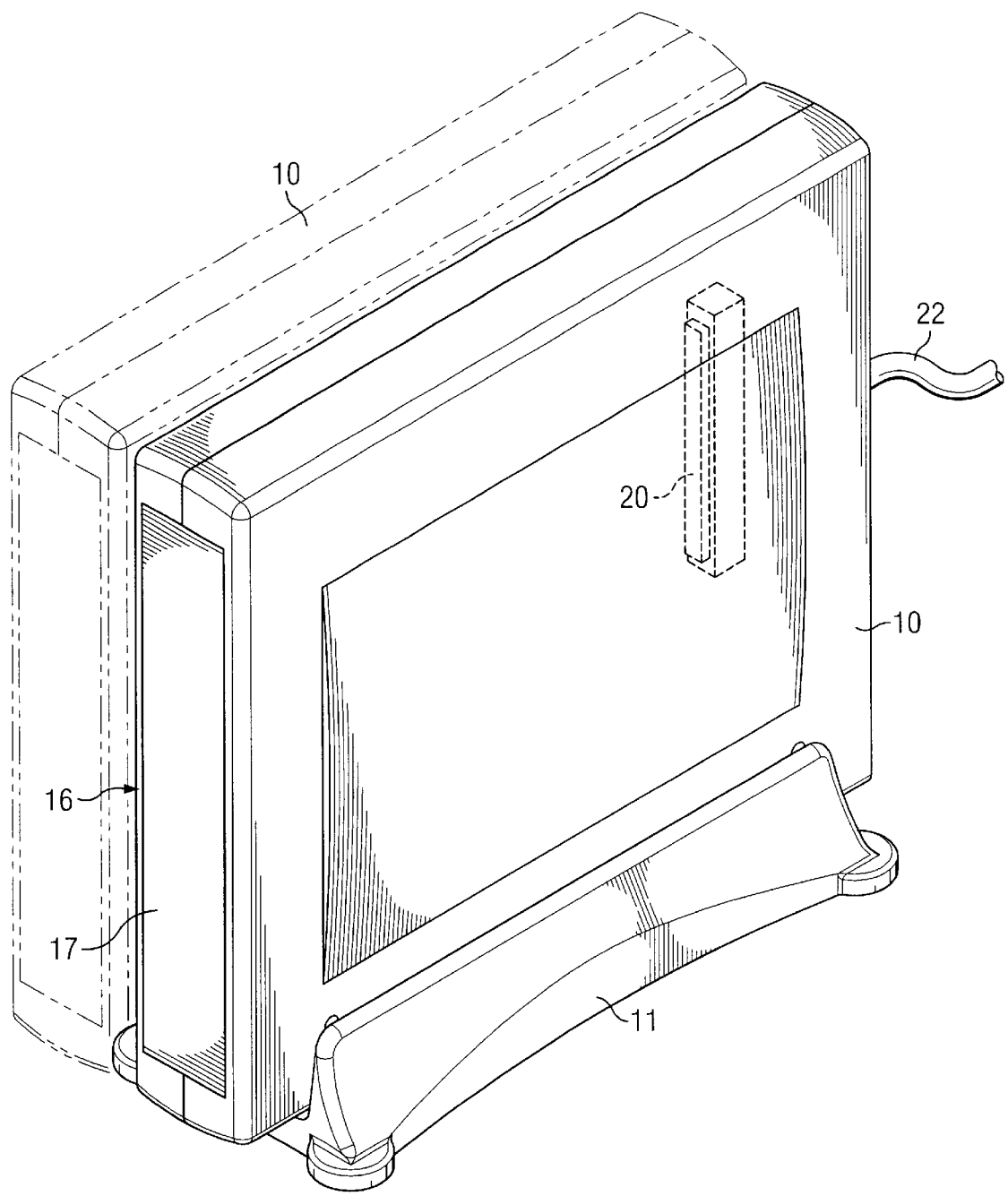
FIG. 1 is a perspective illustration of the external casing of a first external docking bay shown in an upright position and made in accordance with the principles of a preferred embodiment of a first aspect of the present invention with a second external docking bay shown in phantom image.

A first aspect of the present invention is illustrated in FIG. 1. FIG. 1 shows an external docking bay 10. A second, identical, external docking bay is also shown in phantom image in FIG. 1. The single external docking bay 10 pictured is designed to enable a single portable computer peripheral 12 to be electrically coupled to a portable computer 14 (see FIG. 2) or to some other computing device. As shown in FIG. 1, a stand 11, is provided to hold the external docking bay 10.

In an exemplary illustration, the portable computer 14 is a notebook computer manufactured and/or sold by such industry leaders in computer notebooks such as IBM Corporation ("IBM"), Compaq Computer Corporation ("Compaq") or Toshiba America Information Systems, Inc. ("Toshiba"). The external docking bay 10 is comprised of an insertion end, generally designated at 16, and also a bay door 17 where the portable computer peripheral 12 is inserted into the external docking bay 10. Within the external docking bay 10 at an opposing coupling end 18 is an interface port, diagrammatically represented at 20.

Figure 2:
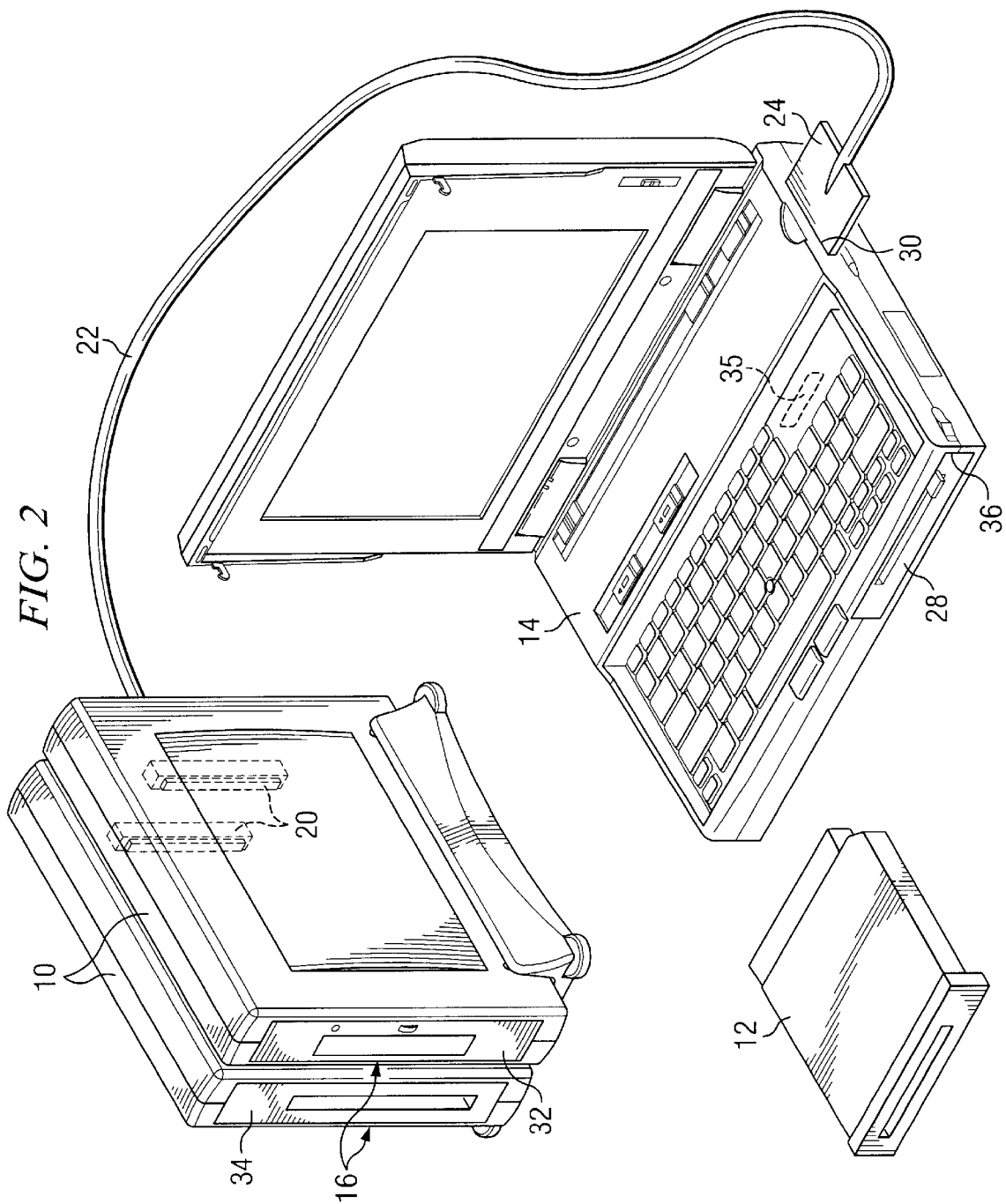
FIG. 2 is an illustrative embodiment shown in perspective of the two external docking bays shown in FIG. 1, now electrically coupled to a portable computer via a PC card (PCMCIA) slot.

As shown best in FIG. 2, the portable computer peripheral 12 is electrically coupled to the interface port 20 because the interface port 20 is constructed to be substantially identical in physical dimensions and pinouts to a multi-function port 35 in the multi-function bay 36 of the portable computer 14. The interface port 20 is electrically coupled to a cable 22 which is also electrically coupled to a coupling device 24 shown partially inserted into the portable computer 14. The coupling device 24 (here configured as a PC card) enables the external docking bay 10 to be electrically coupled to the portable computer 14 at a portable computer interface port 30 (FIG. 2).

It should be noted that the external docking bay 10 is constructed to receive portable computer peripherals 12 which are designed to fit within a multi-function bay 36 of the portable computer 14 without modification. Therefore, the pertinent dimensions the external docking bay 10 are the same as those of a multi-function bay 36 in the portable computer 14.

It will also be appreciated that the two or more external docking bays 10 shown in FIG. 1 can be joined together as shown by the phantom image of an external docking bay 10 in FIG. 1 and as shown in FIG. 2. Advantageously, a plurality of portable computer peripherals 12 can therefore be simultaneously coupled to the portable computer 14. One of the benefits of this configuration is that instead of having to swap portable computer peripherals 12 by shutting down the computer, replacing the current portable computer peripheral 12 with the desired portable computer peripheral 12, and then rebooting, all portable computer peripherals 12 are available without swapping. Moreover, the preferred embodiments of the present invention provide for "hot swapping" of the peripherals. The present invention also provides for management of the use of data communication lines within the cable 22 when two or more external docking bays 10 are coupled together. When necessary, the present invention provides communication management between two or more external docking bays 10 which is similar to bus arbitration techniques, as known to those skilled in the art, which determine which devices are able to use bus lines and when.

Still referred to FIG. 2, an illustration of an exemplary situation of the embodiment described in FIG. 1 will be provided. When a user has a floppy drive unit 28 presently installed in a multi-function bay 36 of the portable computer 14, this embodiment enables simultaneous use of another portable computer peripheral 12, for example a CD-ROM drive unit 32 which is inserted into the external docking bay 10. Normally, the user has no option but to remove the floppy drive unit 28 and install the CD-ROM drive unit 32 in the multi-function bay 36. But in this embodiment of the present invention, the external docking bay 10 is simultaneously coupled via a specific computer interface port. In this embodiment, a PC card slot 30 is used on the portable computer 14 as the interface between the portable computer 14 and the external docking bay 10. Those skilled in the art will appreciate that any appropriate port can be used as the portable computer interface port 30. However, the PC card (PCMCIA) port 30 is an almost universally available interface standard on portable computers which facilitates implementation of this embodiment of the present invention. An added benefit of using the PC card slot 30 as the interface for the external docking bay 10 in this preferred embodiment is that the multi-function bay 36 of the portable computer 14 can still be used.

Two external docking bays 10 are shown coupled together in FIG. 2 so as to have the ability to simultaneously accept two computer peripherals 12. The CD-ROM drive unit 32 is inserted into the external docking bay 10 at the insertion end 16 until it is electrically coupled to an associated interface port 20 within.

For illustration purposes, the remaining interface port 20 within external docking bay 10 is shown having a tape drive backup unit 34 installed therein. However, those skilled in the art will appreciate that the tape drive backup unit 34 is optional. In other words, the interface ports 20 within the external docking bay 10 do not have to be filled for proper operation of the portable computer 14. One or both of the interface ports 20 can be empty when the portable computer 14 is booted. However, in some cases, to be able to use portable computer peripherals 12 other than the one installed in the multi-function bay 36, it may be necessary to install the portable computer peripherals 12 in the external docking bay 10 before booting the portable computer 14.

Assuming that the CD-ROM drive unit 32 and the drive backup unit 34 were installed in the external docking bay 10 before booting the portable computer 14, all three portable computer peripherals 12 are now accessible by the portable computer 14. For example, data stored on a CD in the CD-ROM drive unit 32 can advantageously be copied directly to a floppy disk in the floppy drive unit 28. Likewise, data stored in an internal hard disk 38 within the portable computer 14 can advantageously be copied directly to the tape drive backup unit 34 in the external docking bay 10. A portable computer running a multi-tasking operating system can even execute the data transfer and copying processes described above simultaneously. It is also preferred within the scope of the present invention that the peripherals which are accommodated by the external docking bays be "hot swappable."

Figure 2A:
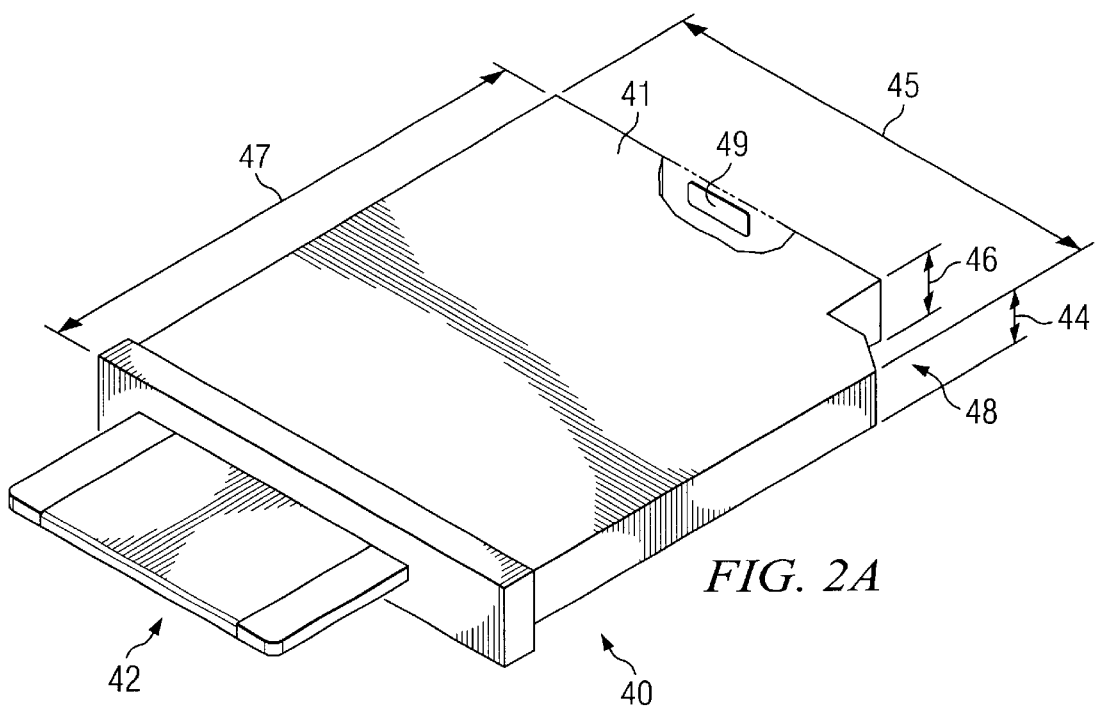
FIG. 2A is a perspective view of a first exemplary peripheral device including a ZIP™ drive which can be used in accordance with the present invention.

Reference will next be made to FIG. 2A. FIG. 2A is a perspective view of a peripheral device, generally designated at 40, in accordance with the present invention. The peripheral device 40 is a mass storage device which is compliant with the standard promulgated by Iomega and known in the industry as a ZIP™ drive and which receives a disk, designated at 42, known in the industry as a ZIP™ disk.

The peripheral device 40 is particularly configured to be received into the multi-function bay 36 (see FIG. 2) of a computer manufactured by Toshiba. The peripheral device 40 includes an enclosure or a housing 41. The housing 41 has a length 47, a width 45, and a thickness 46 all of which is specific to peripherals which are to be received into the multi-function bay 36 of computers complying with the pertinent standard promulgated by Toshiba. The housing 41 includes a lip 48 which extends from one side of the housing 41 and has a thickness 44 which is less than the thickness represented at 46. An electrical connector 49 is provided to make electrical connection with a corresponding electrical connector (represented at 35 in FIG. 2) provided within the multi-function bay 36 of a computer complying with the multi-function bay standard of Toshiba or within the external docking bay 10 (FIG. 2) complying with the multi-function bay standard of Toshiba.

Figure 2B:
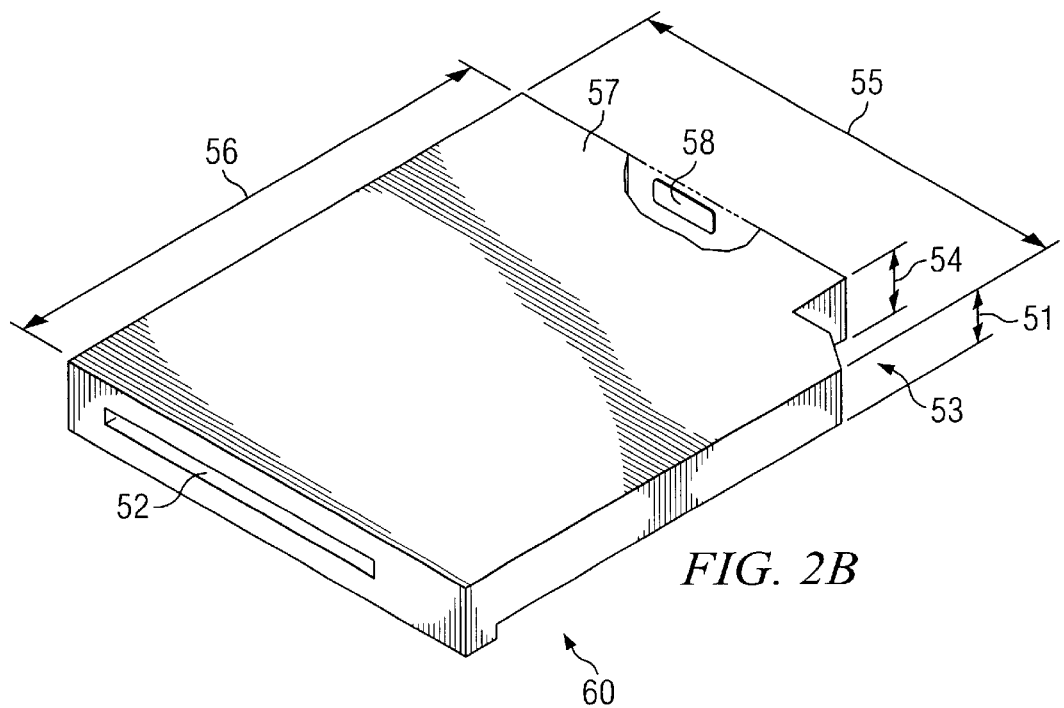
FIG. 2B is perspective view of a second exemplary peripheral device including a ZIP™ drive which can be used in accordance with the present invention.

Reference will next be made to FIG. 2B. FIG. 2B is a perspective view.of another peripheral device, generally designated at 50, in accordance with the present invention. The peripheral device 50 is also a mass storage device which is compliant with the standard promulgated by Iomega and known in the industry as a ZIP™ drive which receives a ZIP™ disk.

The peripheral device 50 is particularly configured to be received into the multi-function bay 36 (see FIG. 2) which complies with the standard promulgated by IBM. The peripheral device 50 includes an enclosure or a housing 57. The housing 57 has a length 56, a width 55, and a thickness 54, all of which is specific to peripherals which are to be received into the multi-function bay 36 of computers complying to the standard promulgated by IBM. The housing 57 includes a lip 53 which extends from one side of the housing 57 and has a thickness 51 which is less than the thickness represented at 54. An electrical connector 58 is provided to make electrical connection with a corresponding electrical connector (represented at 35 in FIG. 2) provided within the multi-function bay 36 of a computer complying with the multi-function bay standard of IBM or within the external docking bay 10 (FIG. 2) complying with the multi-function bay standard of IBM.

Peripheral devices which comply with the multi-function bay standard of any number of different organizations and manufacturers can be arrived at using the teachings set forth herein. Among the steps to be carried out when arriving at a peripheral device in accordance with the present invention are: 1) Providing a housing for the peripheral device which physically fits within the multi-function bay adhering to the pertinent standard; 2) Providing an electrical connector which is compatible with the corresponding electrical connector provided in the pertinent multi-function bay; and, 3) Providing a translation interface so that translation of communications between a first interface standard and a second interface standard can occur so that an operative link between the host computer and the peripheral is established and maintained. In accordance with the present invention, one skilled in the art can use these steps to arrive at peripheral devices which operate within the multi-function bays adhering to any number of different standards.

Figure 2C:
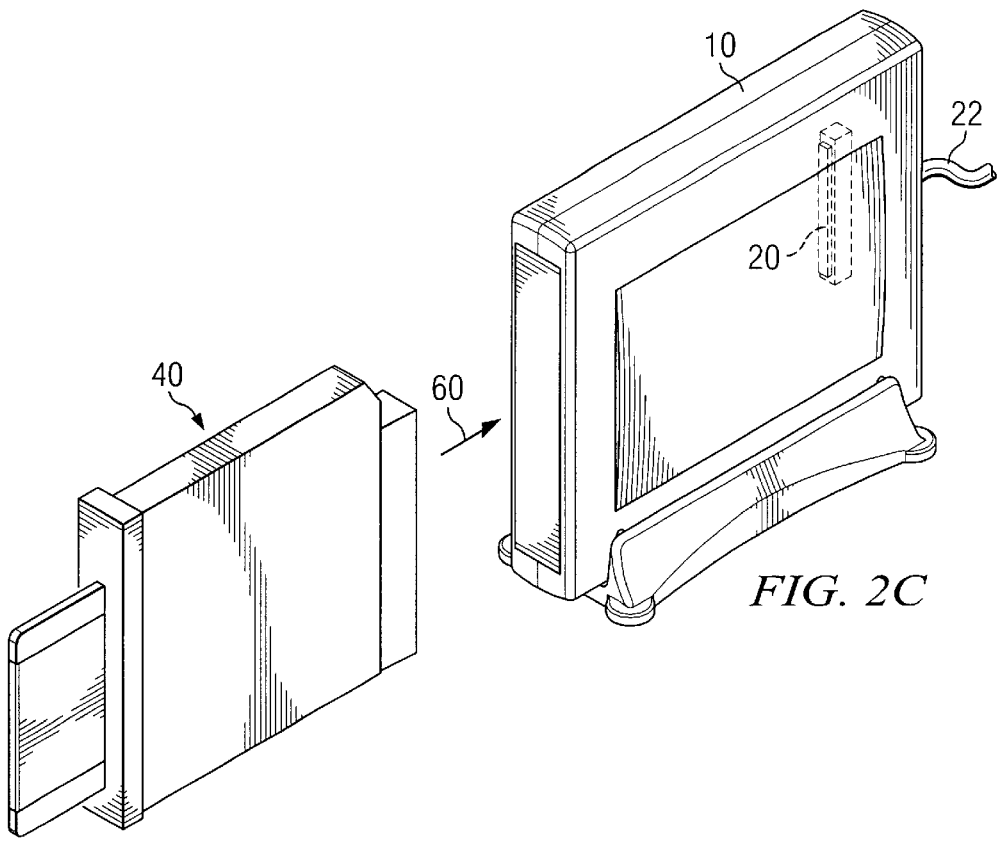
FIG. 2C is a peripheral view of the exemplary peripheral device represented in FIG. 2A ready to be inserted into one of the external docking bays represented in FIG. 1.

Reference will next be made to FIG. 2C. FIG. 2C is a perspective view of the peripheral device 40 represented in FIG. 2A ready to be inserted into the external peripheral device bay represented in FIG. 1 as indicated by arrow 60. As will be appreciated by those skilled in the art, the peripheral device 40 is inserted and removed from the device bay in accordance with the standard promulgated by appropriate manufacturer or organization.

Figure 2D:
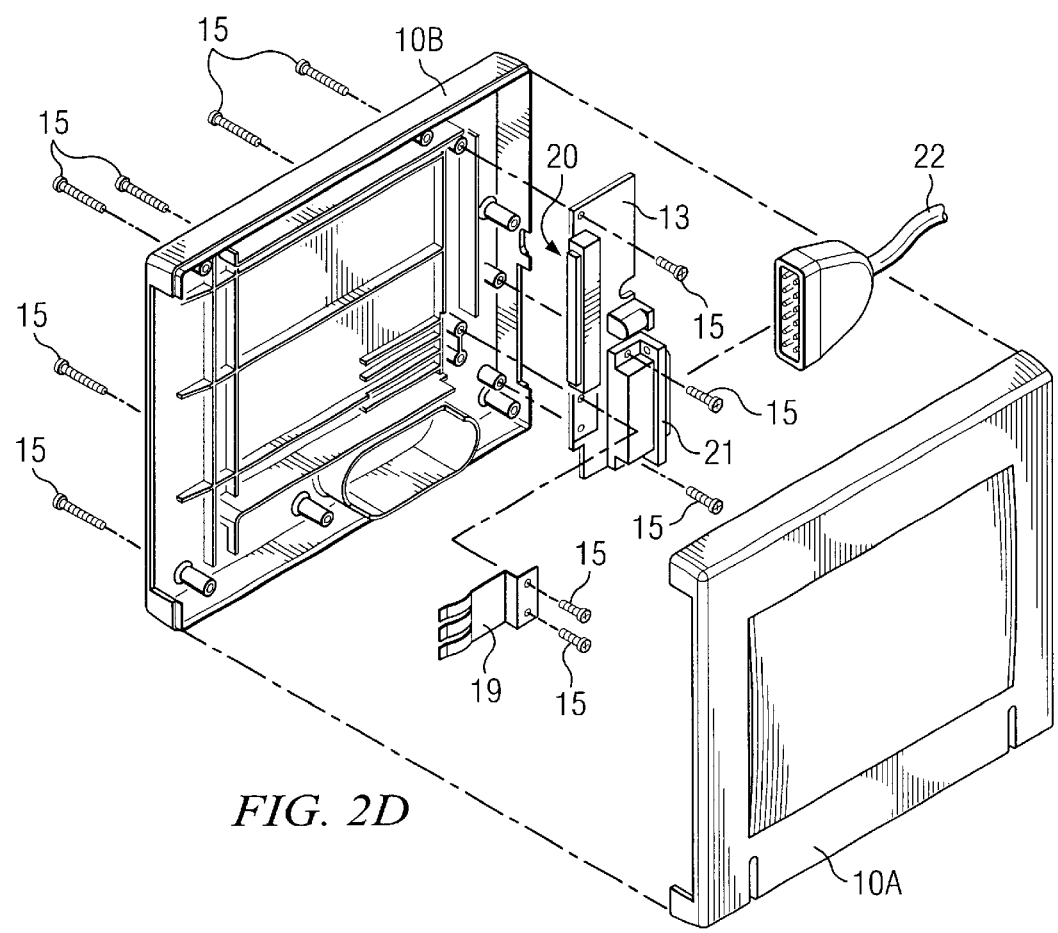
FIG. 2D is an exploded perspective view of the external peripheral device bay represented in FIG. 1.

FIG. 2D is an exploded perspective view of one external peripheral device bay 10 represented in FIG. 1. Those skilled in the art will appreciate that the same pertinent structures can be adapted for use internally to a computing device, such as a desktop computer.

As will now be appreciated from an understanding of the foregoing, the interface port 20 will change according to the standards promulgated by different manufacturers and different organizations. In the case of one preferred peripheral device, adhering to the standard promulgated by Toshiba, the interface port is a 50 conductor connector having the following pin assignments:

| Pin | Assignment |
| --- | --- |
| 1–40 | ATAPI Interface |
| 41, 42 | +5 volts |
| 43–44 | GND |
| 47 | |
| Audio Right 48 | Audio GND |
| 49 | Audio Left |
| 50 | Audio GND |

Represented in FIG. 2D are a first half housing 10A and a second half housing 10B. The first half housing 10A and the second half housing 10B are joined together using some of the screws indicated at 15 such that peripheral devices, such as the peripheral device 40 (FIG. 2A) and the peripheral device 50 (FIG. 2B) can be received therein. In particular, the arrangement illustrated in FIG. 2d can securely receive and hold a peripheral device and the arrangement illustrated in FIG. 2D is particularly configured to receive peripherals complying with the standards promulgated by Toshiba. A circuit board 13 includes the interface port 20 and a cable connector 21 which receives cable 22. A spring 19 is included to make a ground connection with the peripheral device in accordance with the standard promulgated by Toshiba. Some of screws 15 are used to secure the structures together.

From the forgoing, it will be appreciated that docking bays which can be used with, and which comply with, the peripheral standards of any number of different organizations and manufacturers can be arrived at using the teachings set forth herein. Among the steps to be carried out in accordance with the present invention when arriving at a peripheral device are: 1) Providing a housing for the peripheral docking bay which physically receives the peripheral; 2) Providing an electrical connector in the peripheral docking bay which is compatible with the corresponding electrical connector provided on the peripheral; and, 3) Providing a translation interface so that translation of communications between a first interface standard and a second interface standard can occur so that an operative link between the host computer and the peripheral is established and maintained. In accordance with the present invention, one skilled in the art can use these steps to arrive at docking bays which receive peripherals which comply with any number of different standards.

Figure 3:
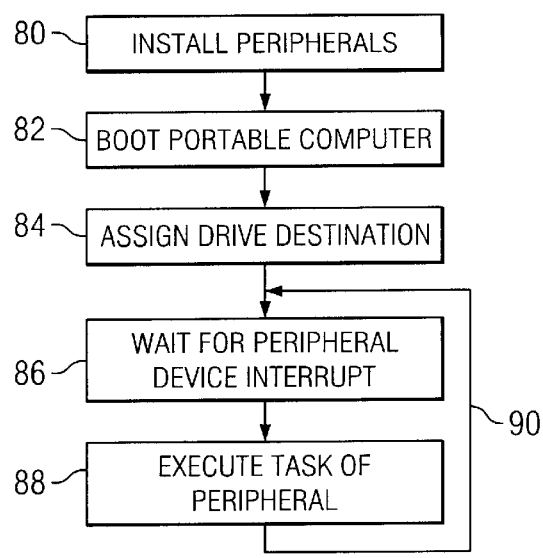
FIG. 3 is a flow chart showing a preferred method of operation of the preferred embodiment of the present invention shown in FIG. 1.

FIG. 3 is a flow chart showing one general method of operation of the preferred embodiment illustrated in FIG. 1. It should be remembered that this illustration is only a preferred embodiment and can therefore be implemented using other methods within the scope of understanding of those skilled in the art after a presentation of the nature of the present invention as taught herein.

FIG. 3 begins with step 80 where all desired portable computer peripherals 12 are installed in an external docking bay 10 having an appropriate number of bays. It should be mentioned that although it was explained earlier that none or as a few as one of the external docking bays 10 need to be filled for the portable computer 14 to operate, the same is true for the multi-function bay 36 of the portable computer 14. The multi-function bay 36 can be empty and the operation of the portable computer 14 will not be affected.

Step 82 requires that the portable computer 14 be rebooted. The portable computer peripherals 12 are now all simultaneously available to the user. In the preferred embodiment, the operating system and/or a hardware component such as a bus controller of the portable computer 14 assigns a unique drive designation to each of the portable computer peripherals 12 in step 84 so that they can be accessed accordingly. For illustration purposes only, the portable computer peripheral 12 in the multi-function bay could always be assigned the designation "C:", the first peripheral in the external docking bay 10 could always be assigned the designation "D:", and so forth until the last portable computer peripheral 12 in the external docking bay 10 is assigned a drive designation. If there is no portable computer peripheral 12 in the multi-function bay 36, then the first portable computer peripheral 12 in the external docking bay 10 will receive the drive designation "C:" and so on as before.

Step 86 in the preferred embodiment encompasses the concept of deciding which of the portable computer peripherals 12 the portable computer 14 is going to communicate with, and when. For example, in the preferred embodiment, an interrupt-type method of communication is chosen. When a portable computer peripheral 12 requires communication with the portable computer 14 or another portable computer peripheral 12, an interrupt can be set which designates the appropriate portable computer peripheral 12 as requiring attention for the portable computer 14.

Step 88 shows that in the preferred embodiment, once the portable computer 14 has determined that one of the portable computer peripherals 14 requires attention, a predetermined amount of time is devoted to responding to the portable computer peripheral's 12 task. The predetermined amount of time might require repeated interruptions of the task while other functions of the portable computer 14 are carried out. Those skilled in the art will appreciate that the function described can be executed in many different ways. However, the portable computer 14 and its operating system can be assumed to already possess the ability to control a plurality of portable computer peripherals 12 already. This should be clear in that the functionality added is an extension of the portable computer's 14 ability to share bus time and perform other task for an internal hard drive 38 and floppy drive unit 28 which are already typically installed in the portable computer 14 (see FIG. 2).

Line 90 is also included to indicate that the portable computer 14 is always looping back to check on a status of other portable computer peripherals 12, if any, after a task is completed, or even during a task if the portable computer 14 and operating system enable such an interruption. It will be appreciated by those skilled in the art that peripheral device status checking is accomplished by numerous methods, and are considered to be within the scope and teachings of the present invention.

It is also envisioned that some portable computer peripherals 12 use the same pinout configurations, but that signal timing is altered. Therefore, the present invention is prepared to compensate for these timing differences or pinout variations by an appropriate method known to those skilled in the art. For example, a signal which must be generated on a particular line for a certain length of time, as required by the portable computer 14, can be extended by the external docking bay 10 if the portable computer peripheral 12 otherwise drops the signal too early. Likewise, the external docking bay 10 can also cut signal short in the same manner.

It is to be appreciated that the steps described in connection with FIG. 3 is merely exemplary and that many alternative procedures can be used in accordance with the present invention.

Figure 4:
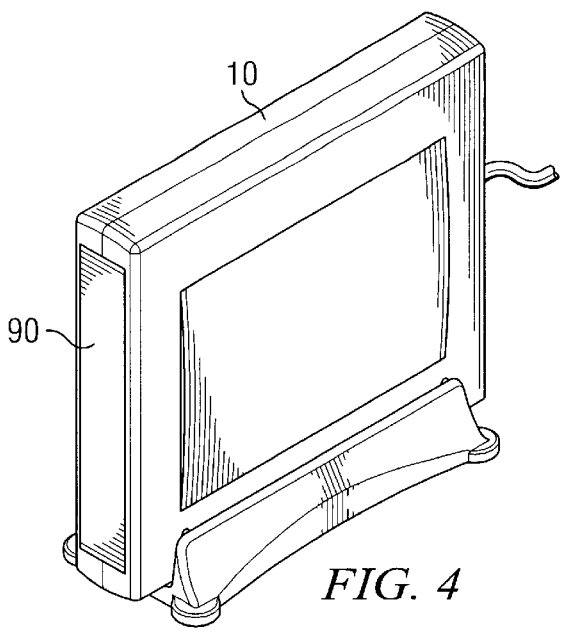
FIG. 4 is an illustration in perspective of an external hard drive unit which is electrically coupled to the external docking bay 10 so as to be used by the portable computer with which it cannot typically communicate.

FIG. 4 shows that an external hard drive unit 90 is electrically coupled to the external docking bay 10. There are some hard drives which do not conform to typical bus interfaces because they are much larger than a typical hard drive. The external docking bay 10 can be used as an interface between the bus of the portable computer 14 and the hard drive 90. It should be appreciated by those skilled in the art that another advantage of the present invention therefore is the ability to function as an interface to the portable computer 14 for peripherals which are not normally compatible.

Figure 5:
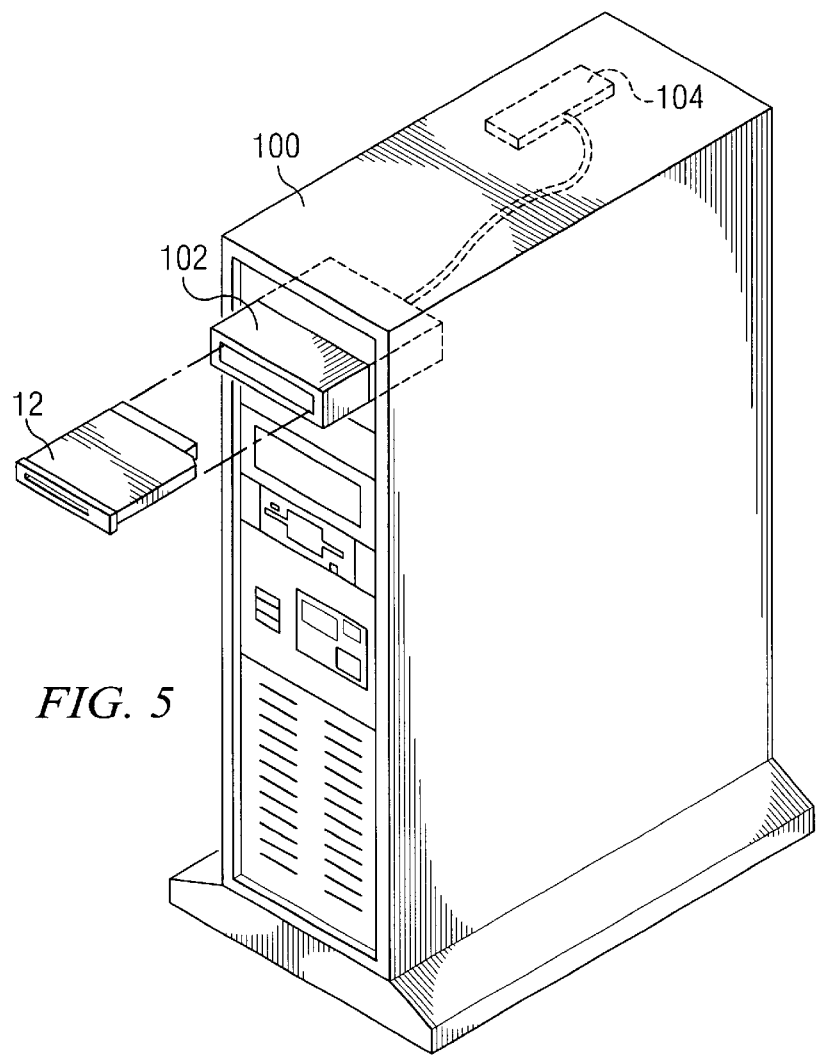
FIG. 5 illustrates another alternative embodiment of the present invention which shows that portable computer peripherals can also be used on a desktop computer via a standard interface port module within a slot of the desktop computer.

FIG. 5 illustrates another alternative embodiment of the present invention which shows that portable computer peripherals 12 can also be used on a desktop computer 100, and thereby avoid duplicate but otherwise necessary and expensive proprietary purchases to outfit both a portable computer 14 and the desktop computer 100 with the same peripherals. It should be realized that this embodiment has application for use in an expansion chassis (not shown) as well.

FIG. 5 shows a docking bay 102 which is internally installed within a slot of a desktop computer and is electrically coupled to an internal bus slot 104 of the desktop computer 100 by any appropriate means such as direct connection or via a cable. The desktop computer 100 is shown here in a tower or mini-tower configuration. The bus used by the desktop 100 can be any of those commonly used today such as ISA and PCI and which are known to those skilled in the art. Similarly, USB, ATAPI, PCMCIA, IDE, or FireWire peripheral connections also be used to couple the internal docking bay 102 to the desktop computer 100. The internal docking bay 102 provides an interface between the signals being used by the computer peripheral 12, and the industry standardized bus signals used by the desktop computer 100. It is envisioned that an internal docking bay 102 would be purchased for using the computer peripherals 12 of only a particular computer manufacturer. All of the computer peripherals 12 would then be able to function on the desktop computer 100 from within the internal docking bay 102. Alternatively, more than one internal docking bay 102 can be included in the desktop computer 100, each internal docking bay 102 adhering to a different interface standard.

Figure 6:
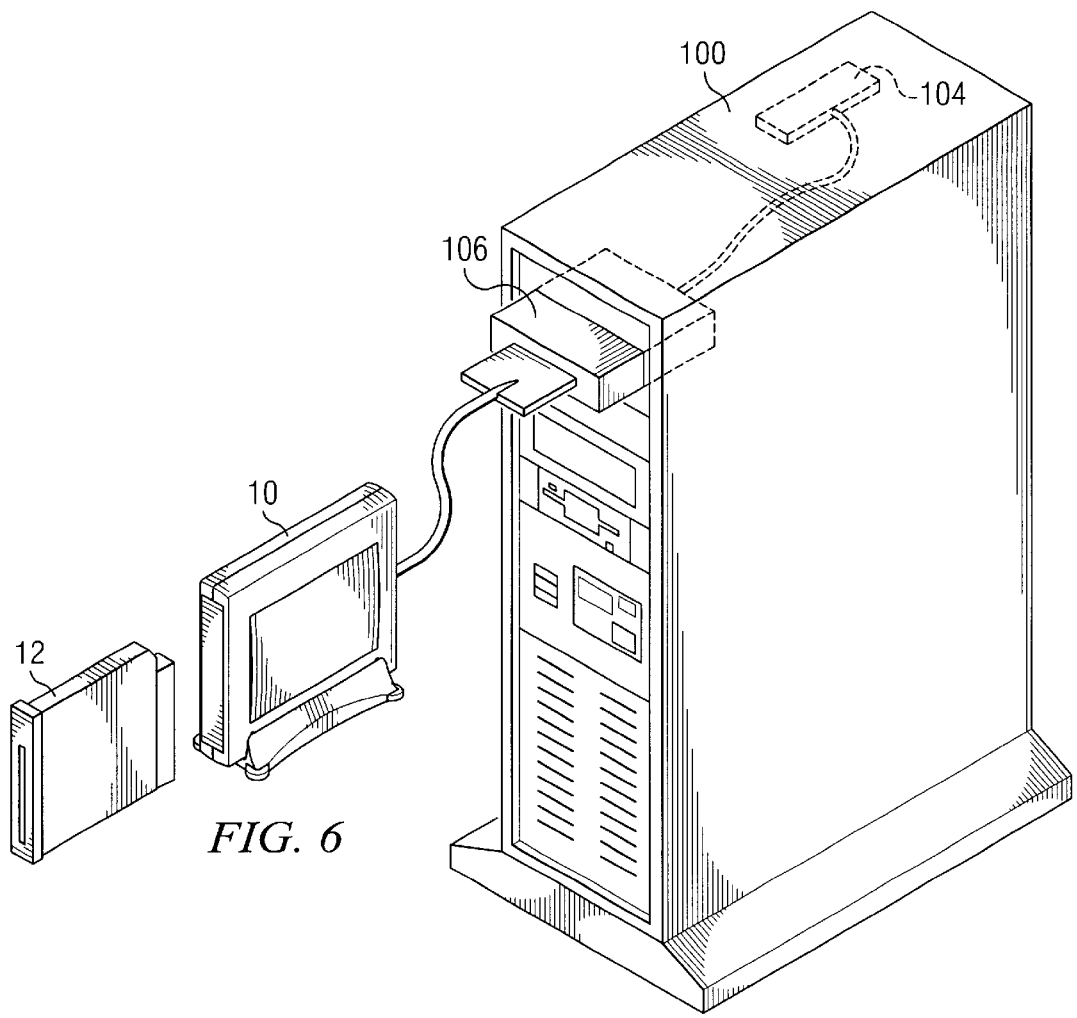
FIG. 6 illustrates an alternative embodiment of FIG. 5 wherein the docking bay of the present invention is installed directly into a slot of a desktop computer, and without a standard interface port module.

FIG. 6 shows a related embodiment of FIG. 5 wherein an external docking bay 102 is electrically coupled to an interface port module 106 installed in a desktop computer 100. This interface port module, which could conform to the interface standards of USB, ATAPI, PCMCIA, IDE, or FireWire, is in turn connected to an internal bus slot 104 of the desktop computer 100. The interface translation of docking bay 102 will be between the interface standard of the specific peripheral device 12 and the interface standard of the port module. The port module will perform the further translation to the ISA or PCI bus standards. A principal advantage of this embodiment is that such interface port modules are typically already installed on a desktop computer.

One benefit that is immediately realized from the described embodiments of FIGS. 5–6 is the advantage of using the same computer peripherals 12 with the desktop computer 100 and the portable computer 14, as shown in FIG. 2.

Figure 7:
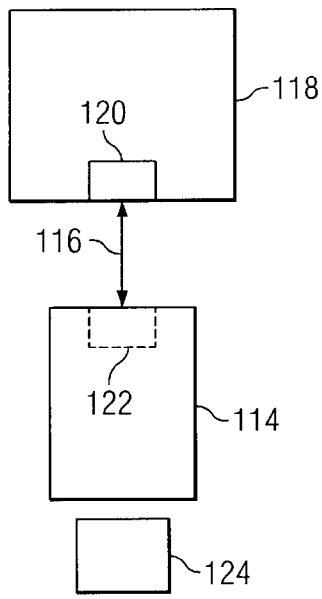
FIG. 7 is a block diagram showing another alternative embodiment of the present invention which accommodates one or more interfaces which are available in the industry.

In accordance with another aspect of the present invention, the present invention provides that one or more industry standard interfaces can be accommodated. Represented diagrammatically in FIG. 7 is a computer device 118 as is known in the industry or which may become available in the future. The computing device 118 can include one or more industry standard interfaces such as those known as PCMCIA, IDE, ATAPI, USB, and/or FireWire (IEEE 1394). The hardware and/or software necessary to implement these industry standards is represented by the interface 120 in FIG. 7.

The signals which are conveyed by the interface 120 are communicated by a hardware link 116, in accordance with which the industry standard interface 120 adheres.

Represented in FIG. 7 is a docking bay 114 which preferably substantially includes the features and structures described in connection with docking bay 10 described earlier. The docking bay 114 also includes an adaptable interface which can accommodate any one, or in some preferred embodiments, more than one, from the group of industry standard interface such as ISA, PCMCIA, USB, IDE, ATAPI, and/or FireWire so that reliable and efficient communication between the adaptable docking bay 114 and the computing device 118 can occur. More information on the FireWire standard can be obtained from the IEEE 1394 standard and the documents which have been promulgated by the IEEE under the 1394 standard are hereby incorporated herein by reference.

As explained above, the docking bay 10 receives one of a number of different peripherals. In the case of the adaptable docking bay 114, a peripheral 124 is received into the adaptable docking bay 114. The peripheral 124 may be any number of different types of devices, such CD-ROM drives, disk drives, and many other different types of devices. Such devices may require different industry standard interface. Thus, the peripheral 124 may require an interface such as an IDE interface, an ATAPI interface, FDD interface, USB interface, FireWire interface, SCSI interface, or another interface.

Represented in FIG. 7 is an interface adapter represented at 122. The interface adapter 122 includes the hardware and/or software which is necessary to allow data and instructions to be transferred between two dissimilar standards. For example, the interface adapter 122 allows communication to efficiently occur between one or more of the following standards, all of which are well known in the industry: PCMCIA, USB, FireWire, IDE, ATAPI, FDD, SCSI, or some proprietary interface which one or more particular manufacturers have adopted or may adopt in the future. Thus, it will be appreciated that if the peripheral 124 requires an IDE/ATAPI interface, the interface adapter 122 can preferably provide adaptable communication in accordance with the FireWire interface, if that is the standard with which the computing device 118 is equipped. It is to be understood that the present invention can be used with many different types of computing devices, not just the computing device 118 represented in FIG. 7.

The preferred embodiment and the alternative embodiments of the present invention teach a system and method for interconnecting computer peripherals with both a desktop computer and a portable computer, where the peripherals 12 can be used on both computers 14 (FIG. 2) and 100 (FIG. 6) and other computing devices. Furthermore, the present invention also teaches that a portable computer can be coupled to more than computer peripheral 12 even though the portable computer has a single multi-function bay, thus eliminating swapping of portable computer peripherals. The present invention is also able to accommodate various proprietary protocols.

Figure 8:
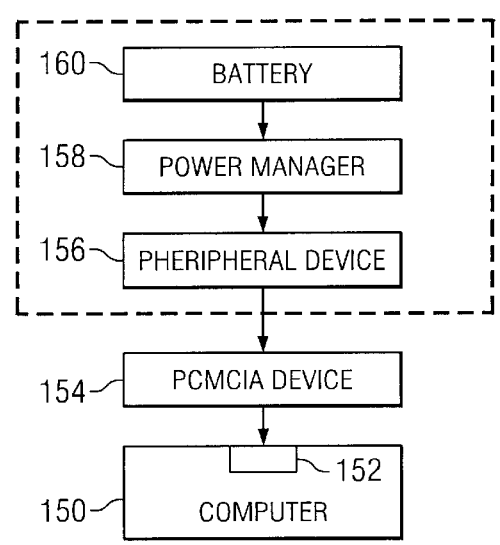
FIG. 8 is a block diagram of another embodiment of the present invention which includes a power management features.

Reference will next be made to FIG. 8 which is a block diagram illustrating another aspect of the present invention. As discussed above, many computing peripherals have not been designed considering portability. Many computing peripherals are designed to operate assuming that a high current source is available to operate the peripheral. The present invention advantageously provides a system and method for providing power to peripherals which provides advantages not previously available.

FIG. 8 provides a block diagram of including a computer indicated at 150. As intended herein, the computer 150 can be any device which stores, manipulates, or utilizes data, for example, portable computers, desktop computers, personal digital assistants (PDAs), still digital cameras, video cameras, and so forth. The computer 150 includes a PC card slot 152 which is compliant with the pertinent PCMCIA standard, as is well known in the industry. A PCMCIA device 154 is inserted into the PC card slot 152 to provide an interface between the computer 150 and a peripheral device 156 so that operation and communication can occur therebetween. As is known in the industry, the PCMCIA standard requires that five volts or 3.3 volts be provided at the PC card slot 152. With evolution toward lower voltage circuitry, this voltage might be 2.7 volts in the future. Current of up to one ampere is also provided, this being the maximum allowed by a particular I/O such as PCMCIA.

As explained earlier, the PCMCIA device preferably provides an interface between the standard used by the peripheral device 156 (for example the ATAPI standard) and the standard used by the computer 150 (for example the PCMCIA standard). The PCMCIA device 154 passes through the five volts to the peripheral device 156.

Many peripheral devices nominally draw less than one amp during operation. Nevertheless, intermittently during the peripheral's operation, the peripheral may draw more than one amp. During times when the peripheral draws more than one amp, the PCMCIA standard does not assure that the current provided via the PC card slot 152 will be great enough to properly operate the peripheral. Thus, a power management unit 158 is provided in accordance with the present invention.

The power management unit 158 can be housed in the same enclosure, represented by the dashed line 162, as the peripheral device 156, or can be separately housed. Also represented in FIG. 9 is a battery 160. The battery 160 can be any power storage device and is preferably one or more alkaline non-rechargeable electrochemical cell. The battery 160 is also preferably housed within the enclosure 162. The enclosure 162 can preferably be the housing of the external docking bay 10 (FIG. 1). Alternatively, the battery 160 and/or the power management unit 158 can be located outside of the enclosure 162.

The power management unit 158 monitors the current which is drawn by the peripheral device 156 from the PC card slot 152 through the PCMCIA device 154. As the current drawn by the peripheral device 156 nears and exceeds a predetermined value, the power management unit 158 draws current from the battery 160 to supplement the current drawn from the PC card slot 152 so the peripheral device 156 will have adequate current for proper operation.

In the preferred embodiment of the present invention described herein, the predetermined value is preferably set at one ampere. It will be appreciated that the predetermined maximum current value can be different than that specified herein and still fall within the scope of the present invention. It will be appreciated that the present invention provides advantages not heretofore available in the art.

Reference will next be made to FIGS. 9A and 9B which together are a detailed schematic diagram showing one preferred arrangement for implementing the power management feature represented in FIG. 8. It is to be appreciated that the detailed schematic diagram of FIGS. 9A & 9B is not to be considered limiting of the scope of the present invention but is to be considered merely exemplary of the many different embodiments which can incorporate the present invention. The components represented in FIGS. 9A & 9B correspond to those components which carry out the functions of the battery (160 in FIG. 8) and the power management unit (158 in FIG. 8).

FIG. 9A shows one possible embodiment of the current limiting circuitry 201, wherein the sensing resistor 180 provides a voltage to the operational amplifier 181 which is proportional to the current flow from the source 200, a PCMCIA interface, for example. When this voltage is compared with the reference voltage 182, and when the sensed voltage exceeds a preset threshold, the amplifier output will linearly raise the gate voltage and thus the "on" resistance of the Field Effect Transistor (FET) 183, thereby effectively limiting the current drawn from the source to the predetermined level. For example, PCMCIA specifies maximum current loading of 1 ampere, while the USB specifies 0.5 ampere. During quiescent low current operation, the relative voltage levels at the amplifier input will cause the FET to be at the lowest resistance level, thus, providing the maximum available voltage at the circuit output 184.

Referring to FIGS. 9A and 9B, voltage 184 charges capacitor 210 via FET switch 203. Capacitor 210 provides voltage at the input of converter 211, which raises the voltage and provides a regulated voltage to the output buffer capacitor 213 and then to the output FET 212 which is connected to the input of the peripheral device, one having an ATAPI interface, for example.

Reservoir battery 204 is connected to capacitor 210 via FET switch 202 and diode 214, and provides energy to capacitor 210 only when the current limiting circuit activation due to excessive load currents causes voltage 184 to drop below the voltage of the battery, thus forward biasing diode 214. The preferred embodiment uses two high energy density "Gold" capacitors in series for the equivalence of capacitor 210 which is illustrated as a single capacitor for simplicity in FIG. 9B. These "Gold" capacitors provide a much larger stored energy reservoir than the usual electrolytic capacitors, and thus relieves the energy demands on the battery, giving the battery a longer useful life.

During start up, FET switches 202 and 212 are off, isolating the battery and the peripheral device from the circuit. If the source voltage 200 is present, comparator 208 goes low turning on FET 203. This allows capacitor 210 to be charged through the current limiting circuit 201 and FET 203, rather than from battery 204. The low output of comparator 208 also turns "ON" the internal comparator of the boost converter chip 211 via transistor 209, and enabling, but not turning "ON", the gate circuitry of FET switch 202 via transistor 205.

After capacitor 210 voltage rises to 4.2 volts, said internal comparator within converter 211, a MAX1703 in this example, activates the output voltage to the peripheral device via transistor 207 and FET 212. Further, this signal provides via transistor 206 a RDY signal 215 back to the computer host to signify that the peripheral is ready, which also enables transistor 205 via diode 209 to turn FET 202 "ON", fully activating the "enabled" backup battery circuit.

When the peripheral device loading discharges capacitor 213 thereby reducing its voltage, the boost converter 211 senses the drop and increases its pulse width to attempt to maintain the output voltage. The energy for this is provided by capacitor 210 and the input source 184 from the PCMCIA interface 200. Under normal low duration load current transients, capacitors 210 and 213 and source 200 provide sufficient energy to support the load currents.

However, for longer duration high current loads, the current will exceed the threshold of the current limiting circuit 201 which will limit the current drawn from the source Vcc 200. With lower charge replenishment from the source 184, the voltage on capacitor 210 will begin to drop which forward biases diode 214, thereby causing the battery 204 to provide the supplemental charge required by the load. When the high current load is removed, the current limit circuit will change back to the lower impedance state and provide greater charge to capacitor 210. This charging, being greater than that required by the peripheral device loading, will raise the voltage on capacitor 210, thus reverse biasing diode 214 and halting the discharge of battery 204.

If, however, the loading is not removed, the battery continues to discharge, and the converter chip 211 provides an output pin for a conventional LED "low battery voltage indicator" (not shown). Typically, the user would then replace the batteries. However, in the event that the batteries are not replaced under this discharged scenario, the system will continue to operate normally until the battery voltage has further discharged to 66% of its initial value. At that point a sensing comparator located within the converter chip 211 will initiate circuit shutdown, causing the load to be disconnected by turning transistor 207 and FET switch 212 "OFF" and the battery to be disconnected via an "OFF" signal to FET switch 202. This additional error-free operating time represents a significant improvement over existing alternative approaches.

FET Switch 203 provides protection for the absence of the Vcc voltage 200. Specifically, any time the capacitor 210 voltage is greater than the voltage 200, FET 203 prevents capacitor 210 from discharging into the PCMCIA source Vcc 200.

Table A, below, provides a description of the preferred components represented in FIGS. 9A and 9B.

TABLE A

FIG. 10

| Reference Designation | Description |
| --- | --- |
| 204 | 3 AA Alkaline Batteries |
| 183, 202, 203, 214 | SI9934DY |
| 181, 208 | MAX4330 |
| 214 | MBRS240LTS |
| 180 | .05 ohms |
| 205, 206, 207 | MMBT3904 |
| 216 | MMBT3906 |
| 210 | 2 "Gold" Capacitors |

Upon examination of FIGS. 9A and 9B it will be appreciated that the circuit represented therein is just one example of a means for limiting the current drawn from the source by the peripheral device to a predetermined value and for supplying supplementary current to the peripheral device. It is to be understand that many different structures can carry out the functions of detecting when the current drawn by the peripheral device exceeds a predetermined threshold and for supplying supplementary current to the peripheral device and all such structures and arrangements which perform the same or equivalent functions are to be considered within the scope of the means for detecting when the current drawn by the peripheral device exceeds a predetermined threshold and for supplying supplementary current to the peripheral device.

In view of the forgoing, it will be appreciated that the power management aspect of the present invention has utility with many different types of peripheral devices, both those which are presently available and which will become available in the future.

In view of the new peripherals and technologies which will be introduced in the future, it is to be understood that systems providing the power management features just described may be different than that represented in FIGS. 9A–9B but yet still fall within the scope of the present invention. In particular, the voltage and current values which are applicable with other peripheral devices may be different than those specified herein yet still fall within the scope of the present invention.

FIG. 10 is a schematic diagram showing one preferred arrangement for adapting a peripheral device which conforms to the IDE interface standard to the PCMCIA interface standard. It is to be understood that the schematic diagram of FIG. 10 is not to be considered limiting of the scope of the present invention but is to be considered merely exemplary of the many different embodiments which can incorporate the present invention. The components represented in FIG. 10 carry out the functions of the coupling device 24 represented in FIG. 2 and the components represented in FIG. 10 can most preferably be housed within a PC card format.

The schematic diagram of FIG. 10 is only one example of a means for translating communications between a computer in accordance with the first interface standard and the peripheral device in compliance with the second interface standard such that an operative link between the computer and the peripheral device is established when a computer peripheral is nested in the peripheral bay. It is to be understood that many different structures can carry out the functions of means for translating communications between a computing device in accordance with the first interface standard and the peripheral device in compliance with the second interface standard and all such structures and arrangements which perform the same or equivalent functions are to be considered within the scope of the means for translating communications between a computer in accordance with the first interface standard and the peripheral device in compliance with the second interface standard.

The arrangement represented in FIG. 10 may or may not require any active components to provide the desired translation depending on the interfaces being translated in accordance with the present invention. It is also within the scope of the present invention to provide means for translating communications which includes active components which can modify existing signals, and create new signals, which are necessary to translate between interface standards. For example, those skilled in the art can arrive at means for translating communications between any of following interface standards: PCMCIA, USB, FireWire, IDE, ATAPI, FDD, and SCSI interfaces; using the teachings provided herein, all of which fall within the scope of the present invention.

In view of the forgoing, it will be appreciated that the present invention provides a system and method for interconnecting computer peripherals and computer systems and for simultaneously connecting multiple portable computer peripherals to a single portable computer interface slot so that peripheral swapping is unnecessary. The present invention also provides a system and method for connecting any of a number of proprietary portable computer peripherals to a single computer interface slot, for connecting portable computer peripherals to a desktop computer so that these peripherals can be shared by both the portable computer and the desktop computer, and for connecting any of a number of proprietary portable computer peripherals to a desktop computer to reduce peripheral redundancy and thereby reduce the cost of peripheral systems to the user.

The present invention also provides a system and method for efficiently powering the computer peripherals.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for providing power to a digital peripheral device via a computer port when the primary power source provides insufficient instantaneous power for powering the digital peripheral device, but otherwise having sufficient average power for powering the digital peripheral device, the system comprising:

means for removably housing the peripheral device, the peripheral device including at least a first electrical connector for carrying a first electrical signal from the peripheral device to a computer device;

means for coupling the first electrical signal between the peripheral device and a computing device, the computing device including a primary power supply;

means for conveying electrical power from the primary power supply to the peripheral device;

means for storing electrical power, the means for storing electrical power positioned outside of the computing device; and a power management circuit being capable of detecting when the current drawn by the peripheral device exceeds a predetermined threshold and being capable of supplying supplementary power to the peripheral device only when the current drawn by the peripheral device exceeds the predetermined threshold such that the operation of the peripheral device is maintained.

2. A system as defined in claim 1 wherein the means for removably housing the peripheral device comprises at least one of a remote docking bay for a computer device and a computer I/O docking bay.

3. A system as defined in claim 2 wherein the computing device comprises one selected from the group consisting of: a desktop computer, a notebook computer, a palmtop computer, a personal digital assistant, a digital camera; and wherein the peripheral device comprises one selected from the group consisting of: a magnetic storage device and an optical storage device.

4. A system as defined in claim 1 wherein the means for coupling the first electrical signal between the peripheral device and the computing device comprises a cable.

5. A system as defined in claim 1 wherein the power supply provides 5, 3.3, or 2.7 volts DC.

6. A system as defined in claim 1 wherein the means for conveying electrical power from the primary power supply to the peripheral device comprises a cable.

7. A system as defined in claim 1 further comprising an enclosure within which the peripheral device is housed and wherein the means for storing electrical energy comprise a capacitor or other energy storage device and an alkaline battery positioned within the enclosure.

8. A system as defined in claim 1 further comprising an enclosure within which the peripheral device is housed and wherein the means for storing electrical energy comprise a capacitor or other energy storage device within the enclosure and an alkaline battery positioned without the enclosure.

9. A system as defined in claim 1 wherein the means for limiting the current drawn from the computing device by the peripheral device is set to a predetermined value of one ampere.

10. A system as defined in claim 1 wherein the first electrical connector comprises a forty conductor connector.

11. A system for electrically coupling a peripheral device to a computing device, the computing device having an interface compliant with a first interface standard, said system comprising:
   a first peripheral bay comprising means for making physical and electrical connection with the peripheral device, the peripheral device being compliant with a second interface standard; and
   means for translating communications between the computer in accordance with the first interface standard and the first peripheral bay in compliance with the second interface standard such that an operative link between the computer and the computer peripheral is established when a computer peripheral is nested in the first peripheral bay.

12. The system as defined in claim 11 wherein the first peripheral bay is positioned external to the computing device.

13. The system as defined in claim 11 wherein the first peripheral bay is positioned internally in the computing device.

14. The system as defined in claim 12 or 13 wherein the first peripheral bay comprises:
   a housing;
   an opening in the housing which receives the peripheral device into the housing, including a lip provided on the peripheral device enclosure.

15. The system as defined in claim 12 or 13 further comprising a second peripheral bay operatively connected to the computing device.

16. The system as defined in claim 12 or 13 wherein the means for making physical and electrical connection with a computer peripheral comprises a fifty conductor connector and a cable.

17. The system as defined in claim 12 or 13 wherein the computer peripheral comprises an enclosure having first, second, third, and fourth sides, the enclosure having a substantially rectangular shape having a lip extending from the first side thereof.

18. The system as defined in claim 12 or 13 wherein the first interface standard is selected from the group consisting of: USB, IDE, ATAPI, FireWire(IEEE1394), and PCMCIA interfaces.

19. The system as defined in claim 12 or 13 wherein the second interface standard is selected from the group consisting of: IDE, ATAPI, FDD, USB, Firewire(IEEE1394), and SCSI interfaces.

20. A system for electrically coupling a first peripheral device to a computing device having an enclosure, the computing device having an interface compliant with a first interface standard and the first peripheral having an interface compliant with a second interface standard, said system comprising:
   a first peripheral bay, the peripheral bay comprising:
      a housing, the housing positioned outside of the enclosure of the computing device;
      an opening at one end of the housing for receiving the first peripheral device into the first peripheral bay and for securing the peripheral device in the first peripheral bay;
      an interface connector positioned in the first peripheral bay, the interface connector coupling with a corresponding connector provided on the peripheral device and receiving signals from the peripheral in compliance with the second interface standard;
   means for conveying the signals from the peripheral bay to the computing device; and
   means for translating the signals of a peripheral device in the first peripheral bay, which are in compliance with the second interface standard, to the first interface standard used by the computing device such that an operative link between the computer and the peripheral device is established when a computer peripheral is received in the first peripheral bay.

21. A system as defined in claim 20 wherein the means for conveying the signals from the peripheral bay to the computing device comprises a cable.

22. The system as defined in claim 21 wherein the first interface standard is selected from the group consisting of: USB, IDE, ATAPI, FireWire(IEE1394), and PCMCIA interfaces.

23. The system as defined in claim 22 wherein the second interface standard is selected from the group consisting of: IDE, ATAPI, FDD, USB, FireWire(IEEE1394), and SCSI interfaces.

24. A system for adapting a peripheral device compliant with a second interface standard for operation with a computing device compliant with a first interface standard, said system comprising:
   means for removably housing the peripheral device, the peripheral device including at least a first electrical connector for communicating at least a first electrical signal;

means for coupling the first electrical signal between the peripheral device and a computing device, the computing device including a power supply;

means for conveying electrical power from the power supply to the peripheral device;

means for storing electrical power, the means for storing electrical power positioned outside of the computing device;

means for limiting the current drawn from the computing device by the peripheral device to a predetermined value and for supplying supplementary power to the peripheral device from the means for storing electrical power when the current drawn by the peripheral device exceeds the predetermined limiting value such that operation of the peripheral device is maintained; and means for translating communications between the computer in accordance with the first interface standard and the peripheral device in compliance with the second interface standard such that an operative link between the computer and the peripheral device is established when a computer peripheral is nested in the first peripheral bay.

25. A system as defined in claim 24 wherein the means for removably housing the peripheral device comprises at least one selected from the group consisting of: an external docking bay and an internal docking bay.

26. A system as defined in claim 25 further comprising a cable communicating the first electrical signal to the computing device.

27. A system as defined in claim 26 wherein the power supply provides 5, 3.3, or 2.7 volts DC.

28. A system as defined in claim 24 wherein the means for conveying electrical power from the power supply to the peripheral device comprises a cable.

29. A system as defined in claim 24 further comprising an enclosure within which the peripheral device is housed and wherein the means for storing electrical energy comprise a capacitor or other energy storage device and an alkaline battery positioned within the enclosure.

30. A system as defined in claim 24 further comprising an enclosure within the peripheral device and wherein the means for storing electrical energy comprise a capacitor or other energy storage device positioned within the enclosure and an alkaline battery positioned outside of the enclosure.

31. A system as defined in claim 24 wherein the means for limiting the current drawn from the computing device by the peripheral device is set to a predetermined value of one ampere.

32. The system as defined in claim 24 wherein the first means for removably housing the peripheral device is positioned externally to the computing device.

33. The system as defined in claim 24 wherein the first peripheral bay is positioned internally in the computing device.

34. The system as defined in claim 32 or 33 wherein the means for making physical and electrical connection with a computer peripheral comprises a fifty conductor connector and a cable.

35. The system as defined in claim 32 or 33 wherein the computer peripheral comprises an enclosure having first, second, third, and fourth sides, the enclosure having a substantially rectangular shape having a lip extending from the first side thereof.

36. The system as defined in claim 32 or 33 wherein the first interface standard is the PCMCIA interface standard.

37. The system as defined in claim 24 wherein the second interface standard is ATAPI interface standard.

* * * * *

UNITED STATES PATENT AND TRADEMARK OFFICE
CERTIFICATE OF CORRECTION

| | |
|---|---|
| PATENT NO. | : 6,526,515 B1 |
| APPLICATION NO. | : 09/461311 |
| DATED | : February 25, 2003 |
| INVENTOR(S) | : Paul Charles et al. |

It is certified that error appears in the above-identified patent and that said Letters Patent is hereby corrected as shown below:

In column 18, line 49, in Claim 1, delete "the primary power" and insert --a primary power-- therefor.

In column 19, line 27, in Claim 7, delete "energy" and insert --power-- therefor.

In column 19, line 32, in Claim 8, delete "energy" and insert --power-- therefor.

In column 19, lines 35-36, in Claim 9, delete "the means for limiting" and insert --a means for limiting-- therefor.

In column 19, lines 49-50, in Claim 11, delete "computer" and insert --computing device-- therefor.

In column 19, line 53, in Claim 11, delete "computer and the computer peripheral" and insert --computing device and the peripheral device-- therefor.

In column 19, line 54, in Claim 11, delete "a computer peripheral" and insert --the peripheral device-- therefor.

In column 20, lines 5-6, in Claim 16, delete "a computer peripheral" and insert --the peripheral device-- therefor.

In column 20, line 9, in Claim 17, delete "computer peripheral" and insert --peripheral device-- therefor.

In column 20, line 24, in Claim 20, after "the first peripheral" insert --device--.

In column 20, line 27, in Claim 20, delete "the peripheral bay" and insert --the first peripheral bay-- therefor.

Signed and Sealed this
Nineteenth Day of June, 2012

David J. Kappos
*Director of the United States Patent and Trademark Office*

CERTIFICATE OF CORRECTION (continued)
U.S. Pat. No. 6,526,515 B1

In column 20, line 32, in Claim 20, delete "the peripheral device" and insert --the first peripheral device-- therefor.

In column 20, line 36, in Claim 20, before "peripheral device" insert --first--.

In column 20, line 37, in Claim 20, delete "the peripheral in" and insert --the first peripheral device in-- therefor.

In column 20, line 39, in Claim 20, before "peripheral bay" insert --first--.

In column 20, line 41, in Claim 20, delete "a peripheral device" and insert --the first peripheral device-- therefor.

In column 20, line 45, in Claim 20, delete "computer and the" and insert --computing device and the first-- therefor.

In column 20, line 46, in Claim 20, delete "a computer peripheral" and insert --the first peripheral device-- therefor.

In column 20, line 50, Claim 21, before "peripheral bay" insert --first--.

In column 21, line 2, in Claim 24, delete "a computing device" and insert --the computing device-- therefor.

In column 21, lines 17-18, in Claim 24, delete "computer" and insert --computing device-- therefor.

In column 21, line 21, in Claim 24, delete "computer" and insert --computing device-- therefor.

In column 21, lines 22-23, in Claim 24, delete "a computer peripheral is nested in the first peripheral bay" and insert --the peripheral device is nested in the means for removably housing the peripheral device-- therefor.

In column 22, line 3, in Claim 29, delete "energy" and insert --power-- therefor.

In column 22, line 8, in Claim 30, delete "energy" and insert --power-- therefor.

In column 22, line 15, in Claim 32, delete "first".

In column 22, lines 18-19, in Claim 33, delete "first peripheral bay" and insert --means for removably housing the peripheral device-- therefor.

In column 22, lines 22-23, in Claim 34, delete "the means" and insert --a means-- therefor.

In column 22, line 33, in Claim 37, before "ATAPI" insert --the--.